Patented Apr. 21, 1931

1,802,079

UNITED STATES PATENT OFFICE

CARL HELLE, OF BRUNSWICK, GERMANY, ASSIGNOR TO ELEKTRISCHE LÖT- UND SCHWEISS- GESELLSCHAFT MIT BESCHRÄNKTER HAFTUNG, OF BRUNSWICK, GERMANY

SOLDERING APPARATUS

Application filed October 3, 1929, Serial No. 397,045, and in Germany August 30, 1929.

My invention relates to improvements in soldering apparatus, and more particularly in soldering apparatus in which a transformer is used for electrically heating the soldering iron. In its more specific features my invention relates to apparatus which are constructed for soldering the longitudinal seams of sheet metal cans and the like. The object of the improvements is to provide an apparatus in which the soldering iron is adapted to be moved into and out of soldering position, and in which leads or other flexible members or links connecting the soldering iron with the secondary of the transformer are dispensed with. With this object in view my invention consists in rigidly connecting the soldering iron with the secondary of the transformer and constructing the portion of the secondary surrounding the armature of the transformer so that it can be shifted relatively to said armature for bringing the soldering iron into and out of soldering position.

Figure 1:
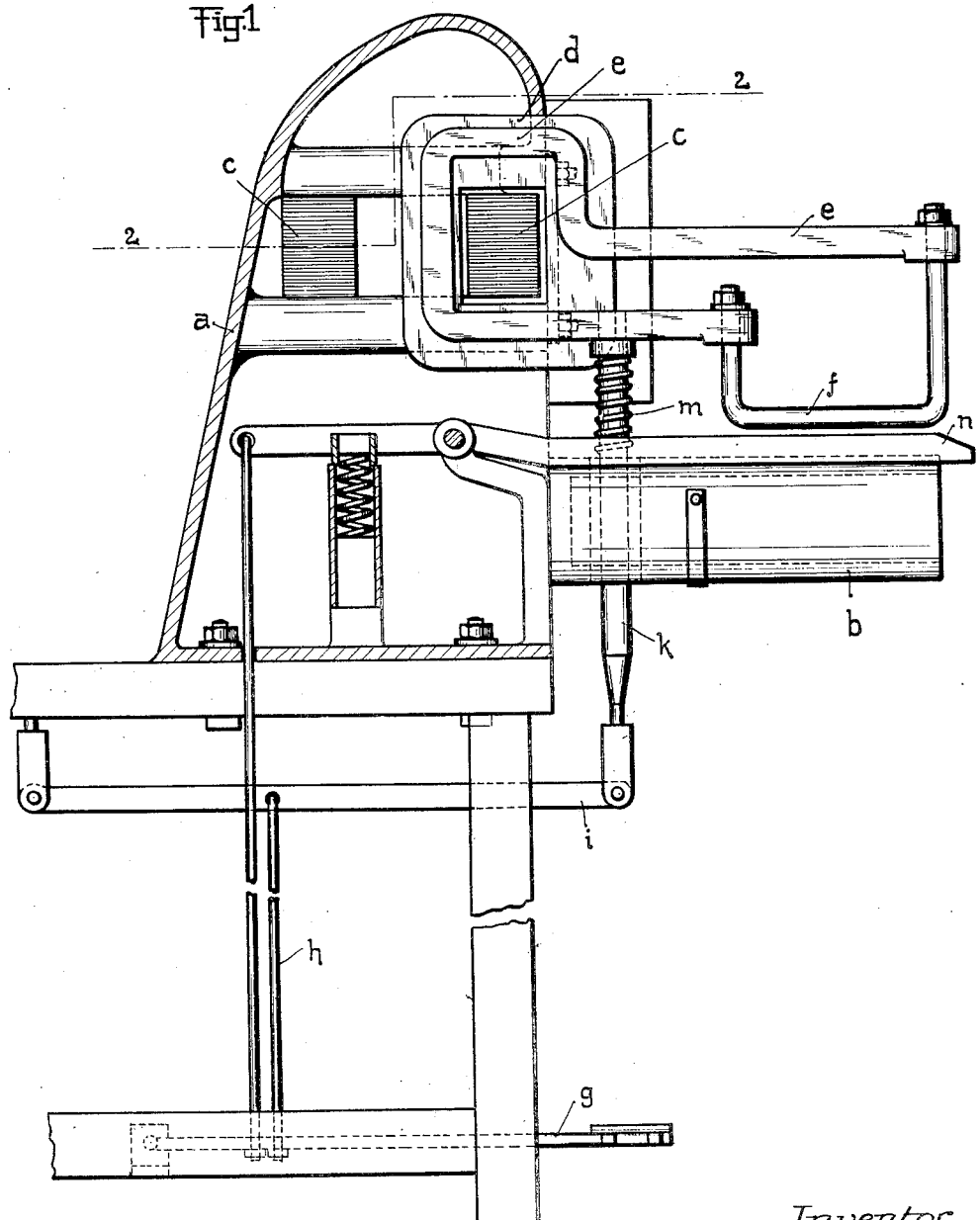
Figure 2:
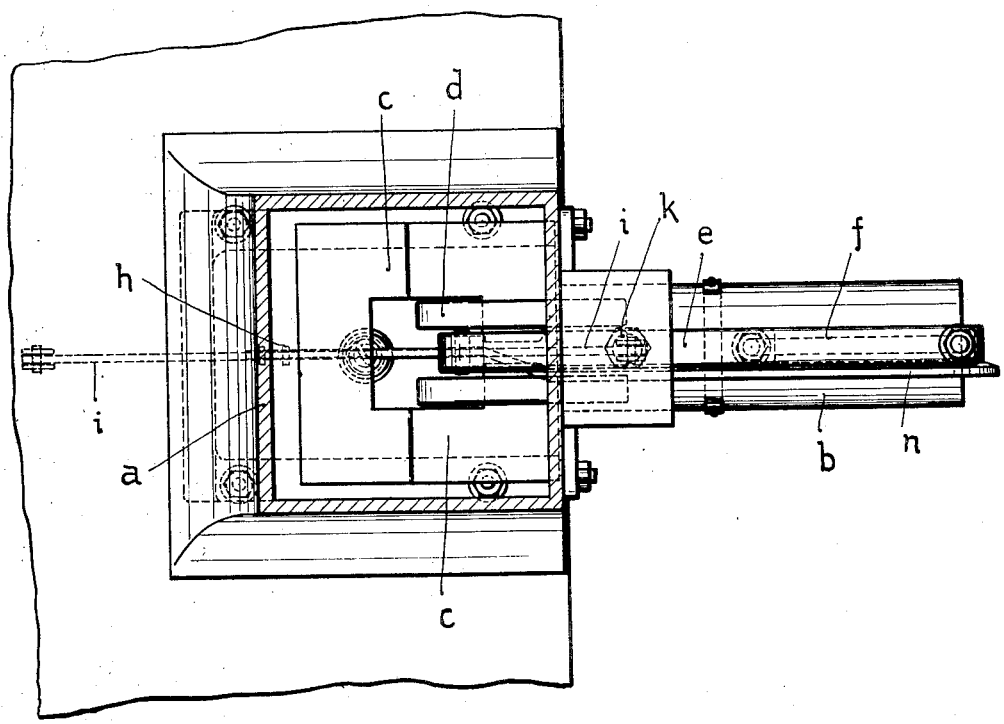

For the purpose of explaining the invention an example embodying the same has been shown in the accompanying drawings in which the same letters of reference have been used in all the views to indicate corresponding parts. In said drawings, Fig. 1, is an elevation partly in section showing the improved apparatus, and Fig. 2, is a sectional plan view taken on the line 2—2 of Fig. 1.

In the example shown in the drawings the soldering apparatus comprises a frame $a$ of any known or preferred construction, the said frame having a mandrel $b$ projecting from the front side thereof for supporting the blanks thereon. Above the said mandrel a transformer is mounted on the frame $a$, the said transformer comprising a yoke $c$ carrying two primary coils $d$ on one of its shanks. Between the said coils $d$ the secondary is located, which consists of a broad copper band bent into annular shape and connected at its ends by a soldering iron $f$. The portion of the secondary surrounding the shank of the armature has so much clearance on the said armature that it can be moved upwardly and downwardly and with the soldering iron $f$ into and out of soldering position for soldering the seam of a can placed on the mandrel $b$, without interrupting the action of the transformer. For thus moving the secondary $e$ upwardly and downwardly a foot lever $g$ is provided which is connected by a link $h$ and a lever $i$ with a rod $k$ passed through a bore of the mandrel $b$ and screwing in a bore of the secondary $e$. On the rod $k$ a spring $m$ is located which tends to move the secondary and the operating mechanism thereof upwardly and out of soldering position. By pressing the lever $g$ downwardly the secondary $e$ is moved with the soldering iron $f$ into contact with the seam of the blank.

For holding the blank in position on the mandrel $b$ a lever $n$ is provided which is adapted to be operated by a foot lever.

In the construction shown in the figures a single secondary is provided on the armature of the transformer. But I wish it to be understood that a plurality of secondaries may be provided on the said armature, in which case each secondary is located between two primaries $d$. Thus a plurality of soldering irons can be operated by the same transformer.

While in describing the invention reference has been made to a particular example embodying the same I wish it to be understood that my invention is not limited to the construction shown in the drawings, and that various changes may be made in the general arrangement of the apparatus and the construction of its parts without departing from the invention.

I claim:

1. The herein described soldering apparatus, comprising a supporting frame having a blank support extending therefrom, and a transformer mounted thereon, the primary of said transformer being fast on said frame, the secondary winding of said transformer movable vertically with respect to said primary and said blank support, the ends of said secondary extending horizontally above said blank support and connected by a U-shaped soldering iron completing the secondary circuit, a compression spring on the blank support and located between the soldering iron and the main body of the secondary for holding the soldering iron in inoperative position and foot operated lever mechanism mounted on said frame for moving the soldering iron toward the blank support for soldering operation.

2. Apparatus as set forth in claim 1 in which a work holder is spring pressed downwardly upon the blank support and is provided with foot operated means for raising the same therefrom for insertion of the blank.

In testimony whereof I affix my signature.

CARL HELLE.